US012639643B2

(12) United States Patent
Woulfe et al.

(10) Patent No.: US 12,639,643 B2
(45) Date of Patent: May 26, 2026

(54) AI-ASSISTED SCHEDULE PLANNER

(71) Applicant: Microsoft Technology Licensing, LLC, Redmond, WA (US)

(72) Inventors: Muiris Woulfe, Dublin (IE); Ata Taner Aydemir, Dublin (IE); Chaitanya Kumar Kamatham, Surrey (CA); Sheetal Prasad Goyal, Hyderabad (IN); Vignesh Ramamoorthy, Dublin (IE); Ievgen Polyvanyi, Dublin (IE); David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 18/395,104

(22) Filed: Dec. 22, 2023

(65) Prior Publication Data

US 2025/0209389 A1     Jun. 26, 2025

(51) Int. Cl.
    *G06Q 10/0631* (2023.01)
(52) U.S. Cl.
    CPC .............................. *G06Q 10/06311* (2013.01)
(58) Field of Classification Search
    CPC ............. G06Q 10/10; G06Q 10/06311; G06Q 10/0631; G06Q 10/109; G06Q 10/103;
    (Continued)

(56) References Cited

U.S. PATENT DOCUMENTS

| | | | | |
|---|---|---|---|---|
| 11,514,405 B1 * | 11/2022 | Douglas | ............. | G06Q 10/1093 |
| 2020/0186482 A1 * | 6/2020 | Johnson, III | ......... | G06Q 10/107 |
| 2022/0246292 A1 * | 8/2022 | DiBenedetto | .......... | G16H 40/67 |

FOREIGN PATENT DOCUMENTS

CN        117492942 A  *  2/2024  ........... G06F 9/4881

OTHER PUBLICATIONS

Dasha, How Generative AI Revolutionizes Appointment Scheduling: Top Benefits and Insights, Aug. 13, 2023. https://dasha.ai/blog/how-generative-ai-revolutionizes-appointment-scheduling-top-benefits-and-insights (Year: 2023).*

(Continued)

*Primary Examiner* — Maria C Santos-Diaz
(74) *Attorney, Agent, or Firm* — Novo TechIP International PLLC

(57) ABSTRACT

A data processing system implements receiving, via a first software application on a client device, a call requesting a schedule to be generated for a user by a generative model. The system further implements identifying online and/or offline data source(s) indicating activities specific to the user, the online and/or offline data source(s) including software application(s) within a workspace; constructing a first prompt by a prompt construction unit as an input to the generative model, the prompt construction unit constructing the first prompt by appending the activities and context data to an instruction string, the instruction string comprising instructions to the generative model to schedule the activities based on the context data, and to assign the scheduled activities into the schedule, the context data being associated with the user and/or the activities; providing the schedule to the client device; and causing a user interface of the client device to present the schedule.

20 Claims, 8 Drawing Sheets

(58) Field of Classification Search
CPC ............... G06Q 10/06; G06Q 10/1097; G06Q
10/1093; G06F 9/4881; G06F 9/542
See application file for complete search history.

(56)                              References Cited

OTHER PUBLICATIONS

Camargo M, Dumas M, González-Rojas O. Discovering generative models from event logs: data-driven simulation vs deep learning. PeerJ Comput Sci. Jul. 12, 2021;7:e577. doi: 10.7717/peerj-cs.577. PMID: 34322588; PMCID: PMC8293933. (Year: 2021).*
Berguer, T. How lemcal is Redefining Online Appointment Scheduling, lemcal, https://www.lemcal.com/blog/how-lemcal-is-redefining-online-appointment-scheduling, Dec. 20, 2023 (Year: 2023).*
S. F. M. Abraar, D. T. Thuduhenage, V. P. Balasubramaniyam, S. R. Mohanraj, G. Wimalaratne and S. Rajapaksha, "Smart Diary: Autonomous System for Daily Diary Creation and Prioritization of Daily Activities for Improved Well-Being Using Neural Networks and Machine Learning," 2022 (Year: 2022).*
L. Dusseault and J. Whitehead, "Open calendar sharing and scheduling with CalDAV," in IEEE Internet Computing, vol. 9, No. 2, pp. 81-89, Mar.-Apr. 2005, doi: 10.1109/MIC.2005 (Year: 2005).*
"Use ChatGPT for Time Management", Retrieved From: https://www.getclockwise.com/blog/chatgpt-time-management, Sep. 16, 2023, 4 Pages.

* cited by examiner

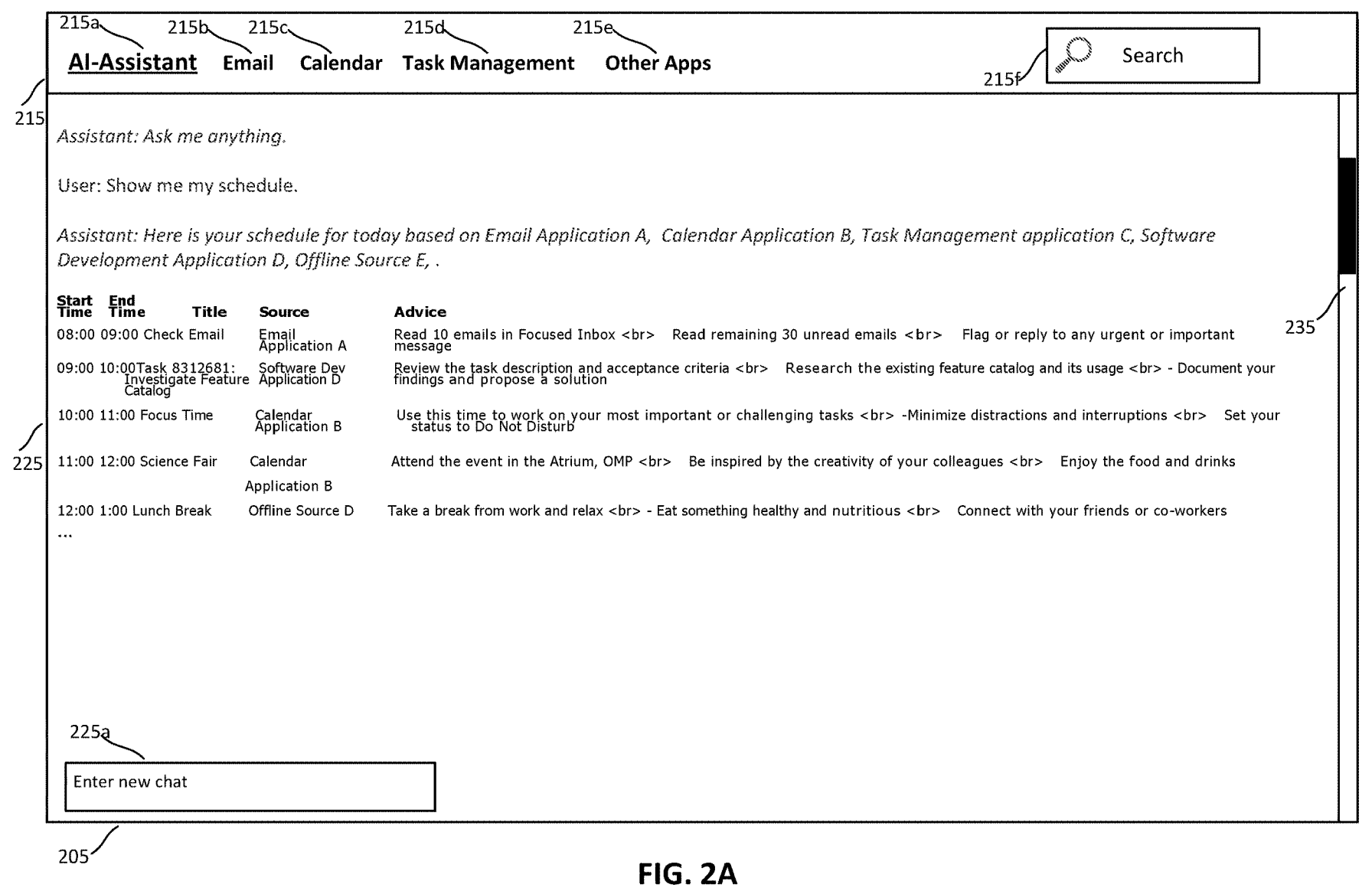

AI-Assistant    Email    Calendar    Task Management    Other Apps    | Search |

*Assistant: Ask me anything.*

*User: Show me my schedule.*

*Assistant: Here is your schedule for today based on Email Application A, Calendar Application A, Calendar Application B, Task Management application B, Task Management application C, Software Development Application D, Offline Source E, .*

| Start Time | End Time | Title | Source | Advice |
|---|---|---|---|---|
| 08:00 | 09:00 | Check Email | Email Application A | Read 10 emails in Focused Inbox <br> Read remaining 30 unread emails <br> Flag or reply to any urgent or important message |
| 09:00 | 10:00 | Task 8312681: Investigate Feature Catalog | Software Dev Application D | Review the task description and acceptance criteria <br> Research the existing feature catalog and its usage <br> - Document your findings and propose a solution |
| 10:00 | 11:00 | Focus Time | Calendar Application B | Use this time to work on your most important or challenging tasks <br> -Minimize distractions and interruptions <br> Set your status to Do Not Disturb |
| 11:00 | 12:00 | Science Fair | Calendar Application B | Attend the event in the Atrium, OMP <br> Be inspired by the creativity of your colleagues <br> Enjoy the food and drinks |
| 12:00 | 1:00 | Lunch Break | Offline Source D | Take a break from work and relax <br> - Eat something healthy and nutritious <br> Connect with your friends or co-workers |

...

Enter new chat 215a  215b  215c  215d  215e  215f  235  215  225  225a  205

FIG. 2A

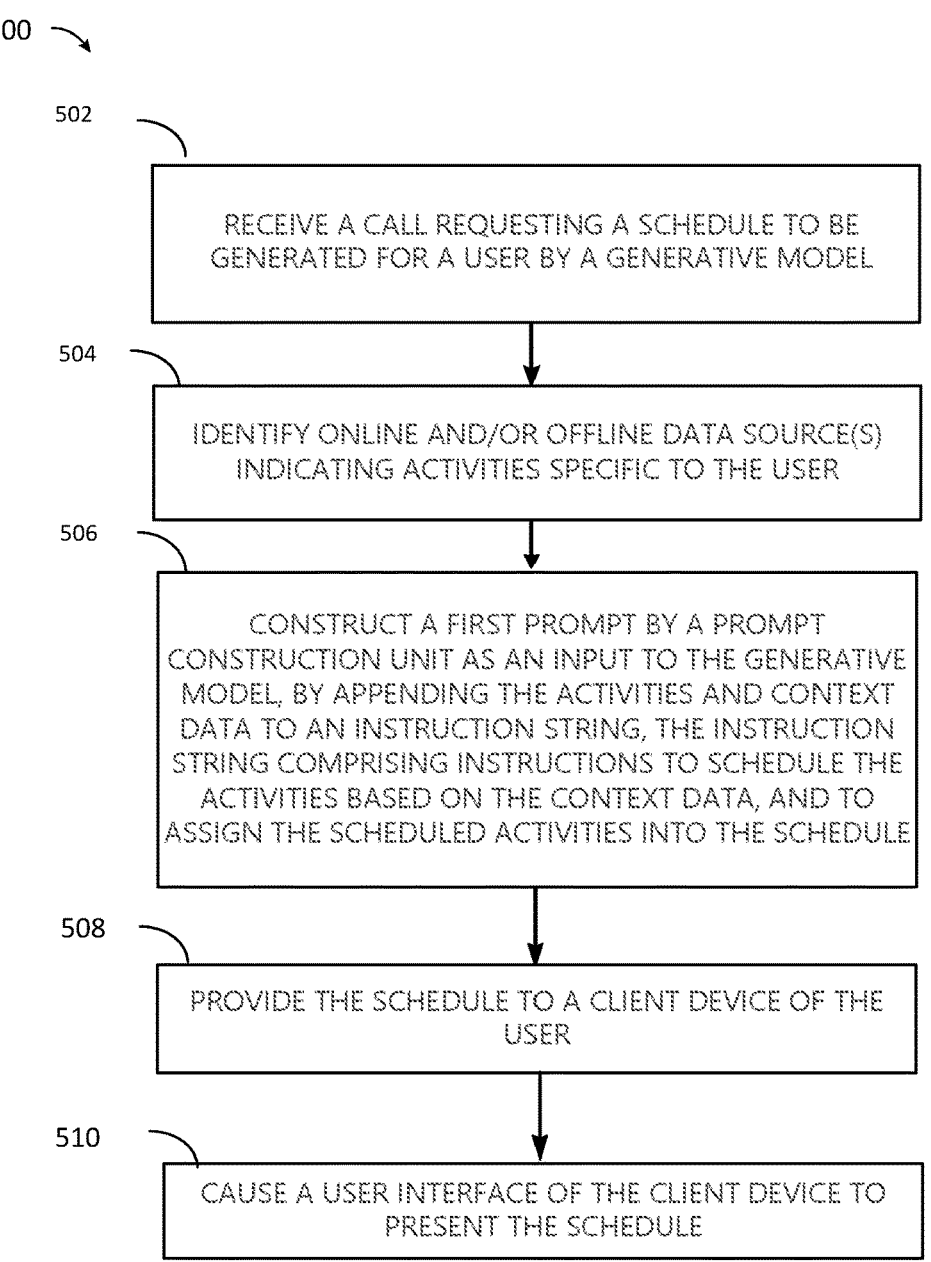

500

502
RECEIVE A CALL REQUESTING A SCHEDULE TO BE GENERATED FOR A USER BY A GENERATIVE MODEL

504
IDENTIFY ONLINE AND/OR OFFLINE DATA SOURCE(S) INDICATING ACTIVITIES SPECIFIC TO THE USER

506
CONSTRUCT A FIRST PROMPT BY A PROMPT CONSTRUCTION UNIT AS AN INPUT TO THE GENERATIVE MODEL, BY APPENDING THE ACTIVITIES AND CONTEXT DATA TO AN INSTRUCTION STRING, THE INSTRUCTION STRING COMPRISING INSTRUCTIONS TO SCHEDULE THE ACTIVITIES BASED ON THE CONTEXT DATA, AND TO ASSIGN THE SCHEDULED ACTIVITIES INTO THE SCHEDULE

508
PROVIDE THE SCHEDULE TO A CLIENT DEVICE OF THE USER

510
CAUSE A USER INTERFACE OF THE CLIENT DEVICE TO PRESENT THE SCHEDULE

FIG. 5

AI-ASSISTED SCHEDULE PLANNER

BACKGROUND

Modern life is busy and demanding with many different types of personal and work tasks. Common strategies to improve time management and productivity include task prioritization, tasks scheduling, eliminating distractions, and the like. In terms of schedule planning, a worker may be actively working on different tasks associated with multiple projects. As a result, the worker may struggle to keep track of the timing and states of these tasks/projects and the respective deadlines. This may lead to frustration and inefficiency. Artificial intelligence (AI) has potential to automate our lives to save time and increase productivity. However, there are technical challenges to realize AI-powered automation, such as input data quality and availability, generative model transparency, and the like. Hence, there is a need for improving systems and methods of AI-assisted schedule planning and keeping the worker informed of changes to tasks/projects that require attention.

SUMMARY

An example data processing system according to the disclosure includes a processor and a machine-readable medium storing executable instructions. The instructions when executed cause the processor alone or in combination with other processors to perform operations including receiving, via a first software application on a client device of a user, a call requesting a schedule to be generated for the user by a generative model; identifying one or more online data sources, one or more offline data sources, or a combination thereof indicating one or more activities specific to the user, the one or more online and offline data sources including one or more second software applications within a workspace, wherein the first software application is a stand-alone software application, or a component of one of the second software applications or another application; constructing a first prompt by a prompt construction unit as an input to the generative model, the prompt construction unit constructing the first prompt by appending the one or more activities and context data to an instruction string, the instruction string comprising instructions to the generative model to schedule the one or more activities based on the context data, and to assign the scheduled one or more activities into the schedule, the context data being associated with the user, the one or more activities, or a combination thereof; providing the schedule to the client device; and causing a user interface of the client device to present the schedule.

An example method implemented in a data processing system includes receiving, via a first software application on a client device of a user, a call requesting a schedule to be generated for the user by a generative model; identifying one or more online data sources, one or more offline data sources, or a combination thereof indicating one or more activities specific to the user, the one or more online and offline data sources including one or more second software applications within a workspace, wherein the first software application is a stand-alone software application, or a component of one of the second software applications or another application; constructing a first prompt by a prompt construction unit as an input to the generative model, the prompt construction unit constructing the first prompt by appending the one or more activities and context data to an instruction string, the instruction string comprising instructions to the generative model to schedule the one or more activities based on the context data, and to assign the scheduled one or more activities into the schedule, the context data being associated with the user, the one or more activities, or a combination thereof; providing the schedule to the client device; and causing a user interface of the client device to present the schedule.

An example data processing system according to the disclosure includes a processor and a machine-readable medium storing executable instructions. The instructions when executed cause the processor alone or in combination with other processors to perform operations including receiving, via a first software application on a client device of a user, a call requesting a schedule to be generated for the user by a generative model; identifying one or more online data sources, one or more offline data sources, or a combination thereof indicating one or more activities specific to the user, the one or more online and offline data sources including one or more second software applications within a workspace, wherein the first software application is a stand-alone software application, or a component of one of the second software applications or another application; constructing a first prompt by a prompt construction unit as an input to the generative model, the prompt construction unit constructing the first prompt by appending the one or more activities and context data to an instruction string, the instruction string comprising instructions to the generative model to schedule the one or more activities based on the context data, and to assign the scheduled one or more activities into the schedule, the context data being associated with the user, the one or more activities, or a combination thereof; providing the schedule to the client device; and causing a user interface of the client device to present the schedule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 2A-2B are diagrams of example user interfaces of an AI-assisted schedule planning application that implements the techniques described herein.

FIG. 5 is a flow chart of an example process for providing AI-assisted schedule planning according to the techniques disclosed herein.

DETAILED DESCRIPTION

Figure 1:
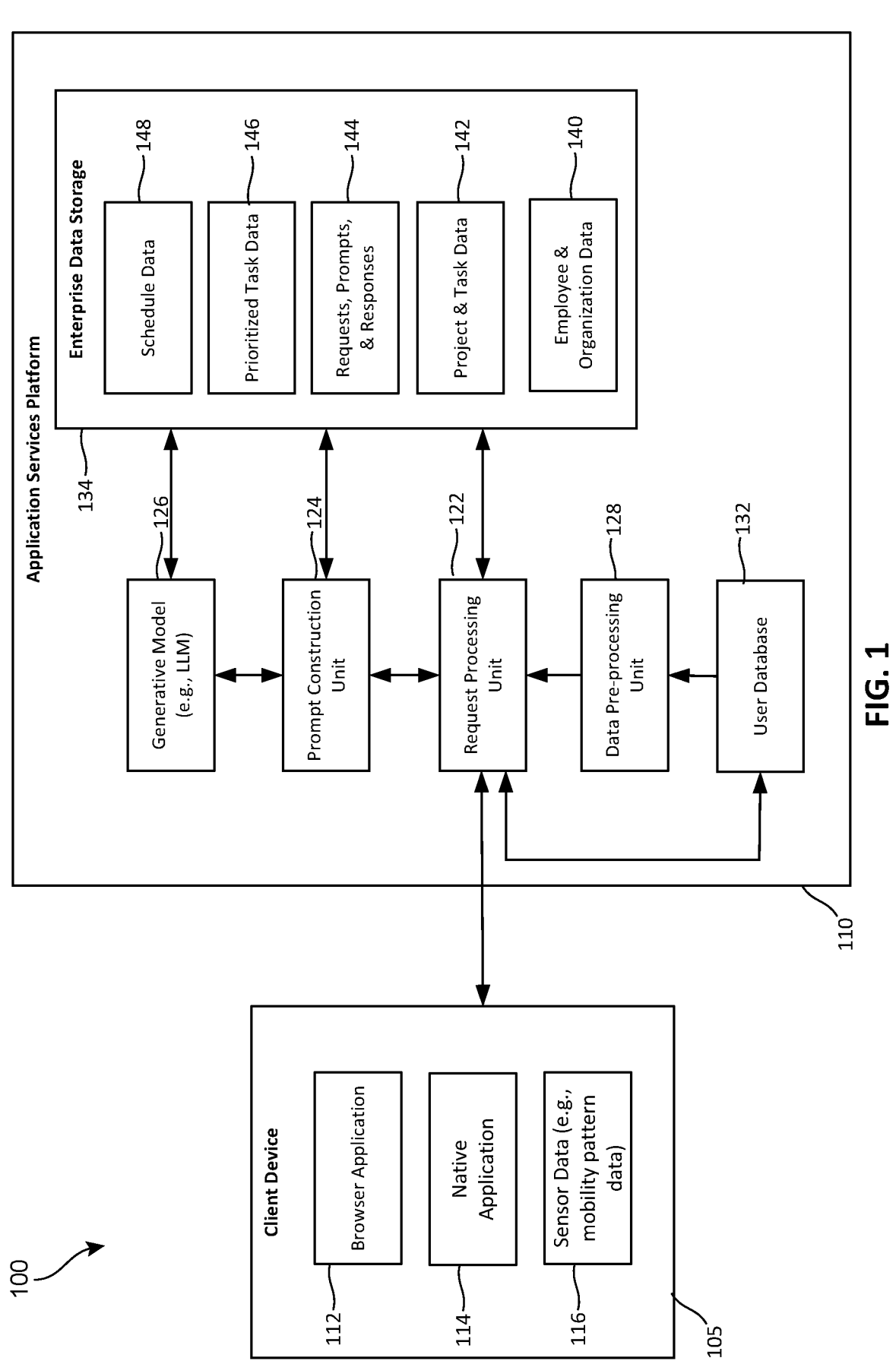
FIG. 1 is a diagram of an example computing environment in which the techniques for providing AI-assisted schedule planning are implemented.

Systems and methods for using generative AI for schedule planning are described herein. These techniques provide a technical solution to the technical problem of data quality and availability for AI-assisted schedule planning. The existing AI-assisted schedule planning relies on a user to manually enter tasks for planning. The quality of the input data is crucial for the model schedule planning performance. However, user memory is unreliable to account for all tasks requiring planning, especially when planning tasks of multiple days or longer. In addition, manual entry is time consuming and impractical for tasks of an extensive time period.

On the other hand, there are workspace applications that aggregate tasks from multiple applications and rank the tasks using machine learning, thereby presenting their relevant task notifications on a user interface based on the ranking. However, these workspace applications have no connection to AI-assisted schedule planning called via a chat interface or a plug-in.

Since AI models are only as good as the input data, the proposed system improves schedule planning output generated using a generative model by improving the quality of the input task data. For instance, the system extracts and/or infers as many user tasks as available from a variety of user signals (e.g., emails, tasks, planner applications, and the like.). The system can automatically retrieve and convert different user signals into a desired format to formulate the prompts. In addition, the system generates prompts as inputs to a generative model, in order to schedule and/or prioritize the user tasks based on context information of the tasks (e.g., task importance, deadlines, and the like) and/or context information of the user (e.g., user preferences), thereby scheduling the tasks based on the priority. The system thus can automatically schedule the extracted/inferred user tasks for one or more days, one or more weeks, one or more months, or even one or more years, as requested by the user.

For instance, the system can assist users to create a schedule consisting of tasks assigned to a discrete time slot with inferred actions that provide context and documentation. Contextual prompts are generated and sent to a large language model (LLM), for example GPT4, which in turn generates the schedule for the user. The prompts take in a variety of user signals from email, task and planner applications, as well as user signals such as preferences so as to support specific prioritization of selected tasks for the schedule. The system also provides an improved user experience (UX) based on an interaction model for schedule generation that leverages the LLM to interactively create and modify the schedule based on the user signals. The system further provides an AI-assisted daily planner application based on a schedule generator that provides the user experience described above.

A technical benefit of the approach provided herein is the schedule generated by the generative language model being more comprehensive and accurately representing the user preferences. Not only does this improve the productivity of the user, but this approach can also decrease the computing resources required to refine the schedule based on user activities/tasks updates and/or additional user queries to the generative model. Another technical benefit of this approach is the automated generation of a schedule comprising a customer's disparate tasks, and doing so in a way that takes the relevant information into account to simplify the customer experience. The system infers suggested actions and suggested durations. The system also assists the customer during the performance of the tasks, thereby further reducing the time spent by the customer on day planning and time management, and it could use user input to refine future schedules. Another technical benefit of this approach is saving the user significant time and effort in refining future schedules based on user inputs. Yet another technical benefit of this approach is that a team can utilize the generative language model to add individual requirements and preferences to a group workplan being generated. These and other technical benefits of the techniques disclosed herein will be evident from the discussion of the example implementations that follow.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to schedule planning assistant applications, presentation applications, website authoring applications, collaboration platforms, communications platforms, and/or other types of applications in which users may create, view, and/or modify various types of task schedules. In the implementation shown in FIG. 1, the application services platform 110 also applies generative AI to generate fast and accurate schedule planning outputs upon user demand via various online and/or offline user task sources according to the techniques described herein. In one embodiment, the application services platform 110 is independently implemented on the client device 105. In another embodiment, the client device 105 and the application services platform 110 communicate with each other over a network (not shown) to implement the system. The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

As used herein, the term "an activity specific to the user" refers refer to any task, event, appointment, class, competition, sports, and the like that requires user's action(s) and/or attention. Although various embodiments are described with respect to tasks, it is contemplated that the approach described herein may be used with any event, appointment, class, competition, sports, and the like.

A "workspace" is a technology framework that brings together the applications, tools, and resources needed to get work done and collaborate securely in the digital world.

The client device 105 includes a native application 114 and a browser application 112. The native application 114 is a web-enabled native application, in some implementations, which enables users to view, create, and/or modify task schedules. The web-enabled native application utilizes services provided by the application services platform 110 including but not limited to creating, viewing, and/or modifying various types of task schedules and obtaining user task data source(s) for creating and/or modifying the task schedules. The native application 114 implements a user interface 205 shown in FIGS. 2A-2B in some implementations. In other implementations, the browser application 112 is used for accessing and viewing web-based content provided by the application services platform 110. In such implementations, the application services platform 110 implements one or more web applications, such as the browser application 112, that enables users to view, create, and/or modify task schedules and to obtain user task data for creating and/or modifying task schedule(s). The browser application 112 implements the user interface 205 shown in FIGS. 2A-2B in some implementations. The application services platform 110 supports both the native application 114 and the browser application 112 in some implementations, and the users may choose which approach best suits their needs.

In one embodiment, the application services platform 110 includes a request processing unit 122, a prompt construction unit 124, a generative model 126, and a data pre-processing unit 128. In other embodiments, the application services platform 110 also includes a user database 132, an enterprise data storage 134, and/or moderation services.

The request processing unit 122 is configured to receive requests from the native application 114 and/or the browser application 112 of the client device 105. The requests may include but are not limited to requests to create, view, and/or modify various types of task schedules and/or sending natural language prompts to a generative model 126 (explained in detail later in FIG. 3) to generate a schedule according to the techniques provided herein. The generative model 126 can be selected for the user considering the specific field of profession, the availability of pre-trained models, and the like. The request processing unit 122 also coordinates communication and exchange of data among components of the application services platform 110 as discussed in the examples which follow.

In one embodiment, the generative model 126 is a language model trained to generate content (e.g., textual, spreadsheet, chart, report, audio, image, video, and the like) in response to natural language prompts input by a user via the native application 114 or via the web. For instance, the generative model 126 is implemented using a large language model (LLM) in some implementations. Examples of such models include but are not limited to a Generative Pre-trained Transformer 3 (GPT-3), or GPT-4 model. Other implementations may utilize other models or other generative models to generate a schedule according to the presentation style/format preference of a user.

The request processing unit 122 receives a user request to generate a schedule from the native application 114 or the browser application 112. For example, the user request is a natural language prompt input by the user which is then passed on to the prompt construction unit 124. The natural language prompt requests to generate a schedule and identify the user submitting the natural language prompt. The natural language prompt may imply or indicate that the user would like to have the schedule generated by a generative model (e.g., the generative model 126). For example, the user request is expressed in a user prompt: "help me set up a daily schedule," or "I want to use ChatGPT to set up a daily schedule."

Once the generative model 126 tokenizes and interprets the user prompt for setting up the particular schedule, either the generative model 126 or the prompt construction unit 124 can preformulate meta-prompts for querying the user based on external expert knowledge.

The prompt construction unit 124 can use user data associated with the schedule from various user data source (s) to generate task data for scheduling. The user data source(s) can be online/offline databases, documents, articles, books, presentation content, and/or other types of content containing user activity information For instance, user data 132a can be digitized and stored in the user database 132.

Figure 3:
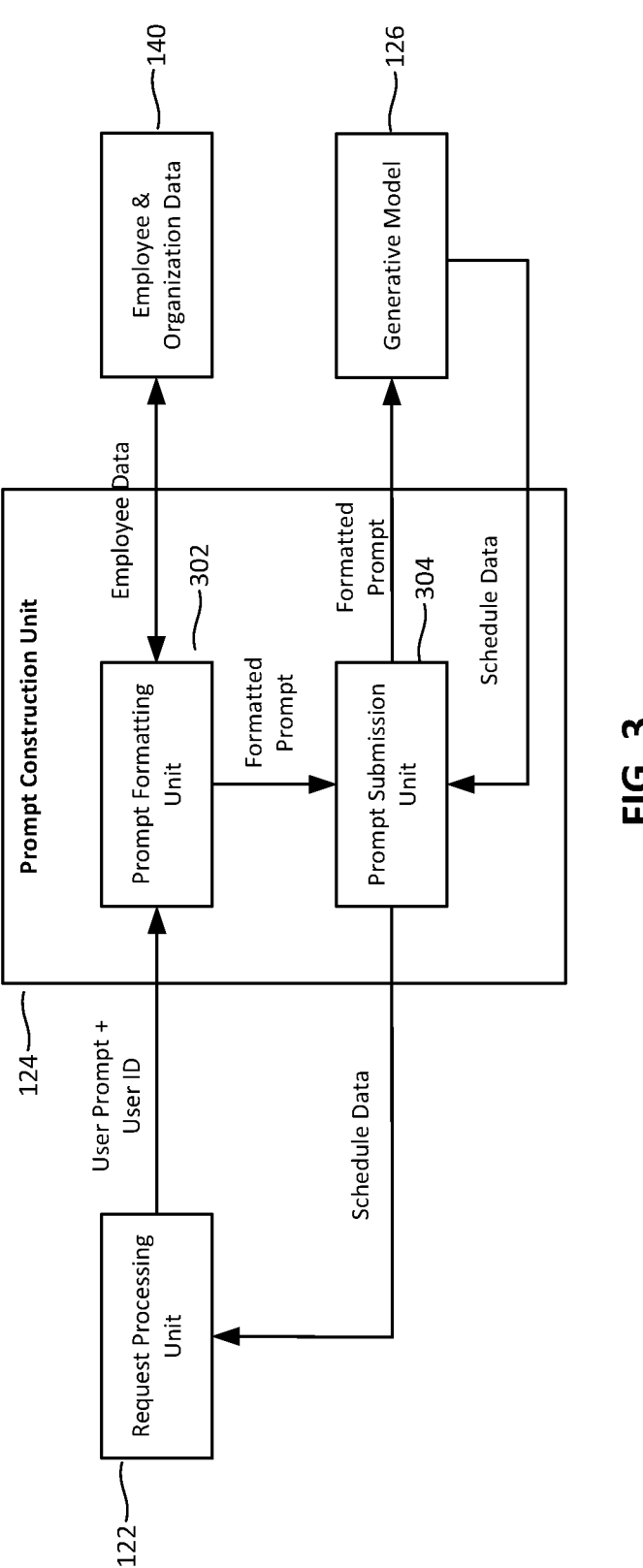
FIG. 3 is a diagram showing additional features of a prompt construction unit of the application services platform shown in FIG. 1.

For structured task data (e.g., calendar entries from calendar application(s), task entries from task management application(s), and the like), semi-structured task data (e.g., emails from email application(s), tweets, and the like), and/or un-structured user data (e.g., a blog post, a social media post, and the like), the prompt construction unit 124 can include the data directly in the prompt to the generative model 126. Additional details are shown in FIG. 3, which is described in detail in the examples which follow.

Generative models, such as the generative model 126, can experience hallucinations in which some of the generated schedule entries are nonsensical or inaccurate for the user, especially tasks identified from un-structured user data. The generative model may experience intrinsic or extrinsic hallucinations. Intrinsic hallucinations contradict the source content, and extrinsic hallucinations cannot be verified or contradicted by the source content. Examples of such intrinsic hallucinations may include but are not limited to the parameter values being simply outside of the defined range (e.g., a group work call scheduled in a different year), or the generative model 126 outputting inconsistent values for the same parameter (e.g., three proposed deadlines for the same task). To address model hallucinations, the data pre-processing unit 128 can parse and filter task parameters (e.g., a user role, a deadline, an importance level, and the like) per task from the semi-structured and/or un-structured elements in semi-structured task data and/or un-structured task data based on machine learning model(s), then include the task parameters in the prompt to the generative model 126.

When the user data is contained in documents, the system can apply document summarization techniques on the documents and then parse natural language and use SQL-type queries to retrieve task parameters into a templatized format. Then, the system can guide schedule planning using task parameters contained in the documentation, and infer actions to complete task(s). For instance, the system can infer from an email in a work email application that the user will join a software development group video conference call on Nov. 13, 2023 at 10:00 am EST. As another example, the system can infer from sensor data 116 (e.g., user mobility pattern data collected by a GPS receiver of the client device 105) retrieved from the client device 105 that the user runs after work every weekday from 5:00-6:00 pm.

Figure 4:
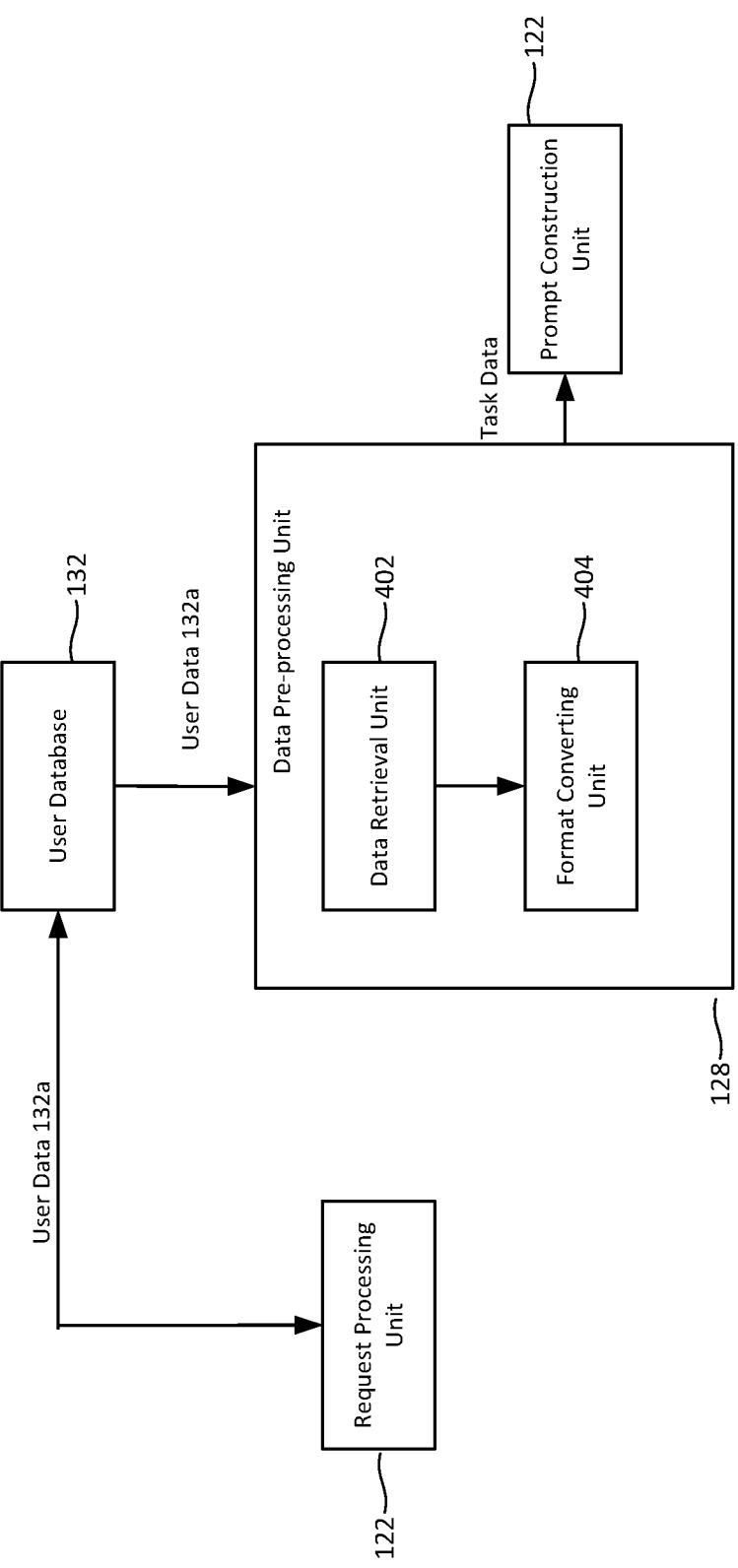
FIG. 4 is a diagram showing additional features of the data pre-processing unit of the application services platform shown in FIG. 1.

Additional details of the data pre-processing unit 128 are shown in FIG. 4, which is discussed in detail in the examples which follow. The data pre-processing unit 128 may reformat or otherwise standardize the information to be included in the prompt to a standardized format that is recognized by the generative model 126. The generative model 126 is trained using training data in this standardized format, in some implementations, and utilizing this format for the prompts provided to the generative model 126 may improve the predictions provided by the generative model 126.

In some implementations, when the user data 132*a* from the user database 132 is already in the format directly processable by the generative model 126, the data pre-processing unit 128 does not need to convert the user data 132*a*. In other implementations, when the user data 132*a* is not in the format directly processable by the generative model 126, the data pre-processing unit 128 converts the user data 132*a* to the format directly processible by the generative model 126. Some common standardized formats recognized by a language model include plain text, Mark-down, HTML, JSON, XML, and the like. In one embodiment, the system converts user data into JSON, which is a lightweight and efficient data-interchange format. In addition, ChatML document format is used to provide document context information to ChatGPT, and ChatML may be used which is a JSON-based format that allows a user to specify the conversational history, dialog state, and other contextual information.

The prompt construction unit 124 then constructs a system prompt based on the user-data and/or the pre-processed user data (e.g., task parameters), and then outputs the system prompt to the language model 126 to generate the schedule for the user.

In the following scenario, the system is deployed to generate a daily work schedule for an information technology (IT) professional, and the system can access employee and organization data 140 contained in an enterprise data storage 134 to achieve this. Employee is one type of user role, so the employee data can be processed as the user data as discussed. Typically, employers own the data stored on company assets, such as computers, smart phones, and the like. This is because the company is providing the employee with the tools and resources they need to do their job, and the data created in the process is thus considered company property. In this case, not only the IT professional, but also other people of the company who are authorized to access the data (e.g., based on the organization data) can request a daily schedule of the IT professional. For instance, a direct supervisor of the IT professional has access to the IT professional's full schedule, while a team member of the same project as the IT professional has access to only the IT professional's tasks associated with the project. The application services platform 110 complies with privacy guidelines and regulations that apply to the usage of the user data 132*a* included in the user database 132 to ensure that users have control over how the application services platform 110 utilizes their data.

In response to a schedule request by the IT professional, the system can query online and/or offline user signals that are relevant to the individual's work and/or personal life. For instance, the system can fetch and infer tasks from user data extracted from one or more of the following (but not limited to) calendar application(s) (e.g., MICROSOFT OUTLOOK CALENDAR®), email application(s) (e.g., MICROSOFT OUTLOOK EMAIL®), task management application(s) (e.g., MICROSOFT TO DO®), and team-work planning application(s) (e.g., MICROSOFT PLANNER®).

In some implementations, based on a role-specific approach, for a software engineer, the system can additionally fetch tasks from software development application(s) (e.g., AZURE DEVOPS®), cloud-based services/platforms for software development (e.g., GITHUB®), and the like. For a salesperson, the system can additionally fetch tasks from enterprise accounting and sales application(s) (e.g., MICROSOFT DYNAMICS®, SALESFORCE®, and the like). Other generic or job-specific sources that provide a means of specifying tasks or from which implicit tasks can be inferred can also be added. In some implementations, user can also customize user data sources according to the user's preference(s), work style(s), and the like.

For example, the prompt construction unit 124 generates the system prompt starting with the content outlined in Table 1. The system prompt can be adapted or extended based on different implementations.

TABLE 1

Create a schedule for my day within the working hours specified. Do not include items after the end of my day. Consider relative priorities, include a time for completing each task within the specified working hours, and infer a list of advice on how to complete each task. Do not move Microsoft Outlook Calendar events from their allocated slots and insert Microsoft To Do tasks and Azure DevOps tasks around the free slots within the specified working hours. Sort items by start time. Include items related to Microsoft To Do, Microsoft Outlook Calendar, Microsoft Outlook Mail, Azure DevOps, and only include them from the user prompt.
SAMPLE DIALOGUE:
\*\* User \*\*:
WORKING HOURS: "10:00" to "18:00"
MICROSOFT OUTLOOK MAIL: "13" Focused Inbox emails, "21" unread emails,
MICROSOFT TO DO TASKS:
\* IMPORTANT "Check Email" from "Daily"
\* "Request Leave" from "Personal" (Content: "Request 1, 2, & 3 December")
AZURE DEVOPS TASKS:
\* "Task 12345: Delete unnecessary code" "3 Hours"
\* "Bug 12342: Get production working" "1 Hours" (Description: "Production needs cert rotation. Rotate ASAP.") MICROSOFT OUTLOOK CALENDAR:
\* "Standup" - "11:00" to "11:30" (Content: "Our daily standup to discuss what we are working on as a team.")
\* IMPORTANT "1:1" - "11:30" to "12:00" (Content: "Time to sync up on career discussions.")
\*\* Assistant \*\*:
[{"StartTime": "10:00", "EndTime":"11:00", "Title":"Check Email", "Source": "Microsoft Outlook Mail", "Advice":["Read 13 emails in Focused Inbox", "Read remaining 21 unread emails"]}, {"startTime":"11:00", "endTime": "11:30", "title":"Standup", "source": "Microsoft Outlook Calendar", "advice":["Examine ADO tasks", "Discuss completed work"]}, TABLE 1-continued

[{ "startTime":"11:30", "endTime": "12:00", "title":"1:1", "source":"Microsoft Outlook
Calendar", "advice":["Discuss . . .

The system prompt in Table 1 respects calendar events and does not move them to different time slots, and it fills the gaps between the calendar events with other tasks from the different sources. In addition, the system prompt in Table 1 gives higher priority to the tasks marked important/urgent.

The system prompt in Table 1 includes dialogue samples (1) to provide more context and guidance to the generative model 126, and (2) to improve the quality and consistency of the output. LLMs are trained on massive datasets of text and code, yet they can still benefit from additional context and guidance for generating text. The samples help the generative model 126 to understand the desired style, tone, and format of the output.

In one embodiment, in response to the user prompt, either the prompt construction unit 124 or the generative model 126 can retrieve user data 132a from the user database 132 based on an indication identifying the user in the user prompt. The indication may be a user identifier (e.g., a username, email address, and the like), and/or other identifier associated with the user that the application services platform 110 can use to identify the user. The user data can include a user role (e.g., a product manager), a user organization, a user division in the organization, a user preferred presentation style (e.g., non-technical descriptive), whether to synchronize the schedule with the user data source(s), and the like. The schedule can be selectively synchronized to some of the user data source(s) based on user preferences. For instance, the system can synchronize the schedule with Outlook calendar or any other calendar system by adding/removing scheduled items to/from the user's calendar.

In some implementations, the system applies the organization data to identify team/group tasks and then schedule team/group activities accordingly. For instance, the system can generate a workplan schedule of multiple IT professionals on the same project(s), such that the IT professionals can have virtual as well as face-to-face interactions and collaborations.

The system utilizes the employee and organizational data 140, such as corporate organizational hierarchy and relationships, team data, employee location data, individual employee's work preferences, and/or collaboration data obtained via organizational graph data, telemetry data and/or user input data. The prompt construction unit 124 can generate a system prompt for a team similar to the system prompt for one user, in order to generate a workplan schedule. The system prompt can include individual preferences and the structure and dynamics of collaboration networks among individuals. The system then input the system prompt for the team to the generative model 126 to generate a workplan for the team.

In some implementations, the user may submit further prompts requesting additional schedule(s) to be generated and/or to further refine the schedule that has already been generated. The request processing unit 122 can store the task items included in the system prompt in some implementations for the duration of the user session in which the user uses the native application 114 or the browser application 112. A technical benefit of this approach is that the task items do not need to be retrieved each time that the user submits a natural language prompt to generate a schedule. The request processing unit 122 maintains user session information in a persistent memory of the application services platform 110 and retrieves the task items from the user session information in response to each subsequent prompt submitted by the user. The request processing unit 122 then provides the newly received user prompt and the task items to the prompt construction unit 124 to construct the prompt as discussed in the preceding examples.

All the above-discussed employee and organization data 140, project and task data 142, request, prompts and responses 144, scheduled and/or prioritized task data 146, and schedule data 148 can be stored in an enterprise data storage 134. The enterprise data storage 134 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In an example, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

Figure 2B:
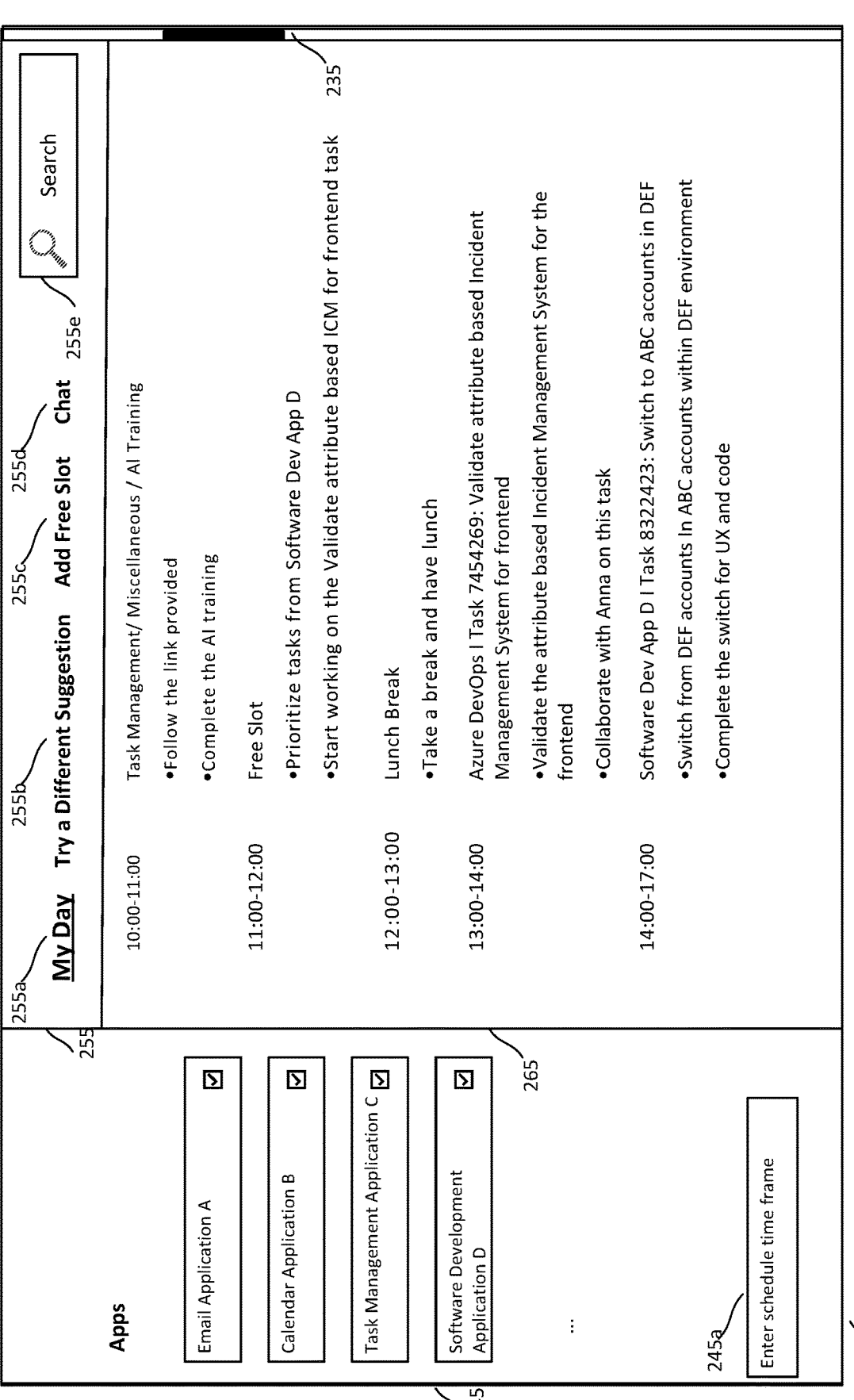

FIGS. 2A-2B are diagrams of an example user interface of an AI-assisted schedule planning application that implements the techniques described herein. The example user interface shown in FIGS. 2A-2B is a user interface of an AI-assisted schedule planning application, such as but not limited to Microsoft Copilot®. However, the techniques herein for providing AI-assisted schedule planning are not limited to use in the AI-assisted schedule planning application and may be used to generate schedules for other types of applications including but not limited to presentation applications, website authoring applications, collaboration platforms, communications platforms, and/or other types of applications in which users create, view, and/or modify various types of task schedules. Such applications can be a stand-alone application, or a plug-in of any application on the client device 105, such as the browser application 112, the native application 114, and the like. For example, the system can work on the web or within a virtual meeting and collaboration application (e.g., MICROSOFT TEAMS®) or an email application (e.g., OUTLOOK®). The system can be integrated into the MICROSOFT VIVA® platform or could work within a browser (e.g., WINDOWS® EDGE®), or MICROSOFT COPILOT®. The system can also work within a website chat functionality (e.g., the BING® chat functionality).

FIG. 2A shows an example of the user interface 205 of an AI-assisted schedule planning application in which the user is interacting with an AI generative model to generate a schedule. The user interface 205 includes a control pane 215, a chat pane 225 and a scrollbar 235. The user interface 205 may be implemented by the native application 114 and/or the browser application 112.

In some implementations, the control pane 215 includes an Assistant tab/button 215a, an Email tab/button 215b, a Calendar tab/button 215c, a Task Management tab/button 215d, an Other Apps tab/button 215e, and a search field 215f. The AI-Assistant tab 215a can be selected to provide schedule planning assistant functions as later discussed. In some implementations, the chat pane 225 provides a workspace in which the user can enter prompts in the AI-assisted schedule planning application. The chat pane 225 also includes a new prompt enter box 225a enabling the user to enter a natural language prompt. In the example shown in FIG. 2A, the chat pane 225 has two Assistant prompts and one user prompt to generate a schedule. The first Assistant prompt "Ask me anything" was generated by the generative model 126.

User prompts usually describe content that the user would like to have automatically generated by the generative model

126 of the application services platform 110. The application submits the natural language prompt to the application services platform 110 and user information identifying the user of the application to the application services platform 110. The application services platform 110 processes the request according to the techniques provided herein to generate a schedule according to the user prompt.

In this example, in response to the user prompt "Show me my schedule," the second Assistant prompt includes a schedule with the description: "Here is your schedule for today based on Email Application A, Calendar Application B, Task Management application C, Software Development Application D, Offline Source E, . . . ."

The Email tab/button 215b can be selected to open an email application in another screen on the client device 105, and then to see source mails (e.g., including a subject line, a brief description, and the like.) corresponding to entries in the schedule highlighted in the email application, or to share prompt history (e.g., the request, prompts and responses 144), the scheduled and/or prioritized task data 146, the schedule data 148, or to synchronize updated/subsequent emails associated with the same task(s) corresponding to entries in the schedule highlighted in the email application, or the like. For example, the user can share example prompt history and the relevant schedule in an email with a product manager to explain its product potential.

Similarly, the Calendar tab/button 215c can be selected to open a calendar application in another screen on the client device 105, and then to see task source entries corresponding to entries in the schedule highlighted in the calendar application, or then to synchronize updated task entries corresponding to entries in the schedule highlighted in the calendar application, or the like. For example, the user can synchronize updated task entries corresponding to entries in the schedule highlighted in the user's calendar application, other members' calendar applications of shared projects/teams, and the like.

By analogy, a Task Management tab/button 215d can be selected to open a task management application in another screen on the client device 105, and then to see task source entries corresponding to entries in the schedule highlighted in the task management application, or to share prompt history (e.g., the request, prompts and responses 144), the scheduled and/or prioritized task data 146, the schedule data 148, or to synchronize updated task entries corresponding to entries in the schedule highlighted in the task management application, or the like.

The Other Apps tab/button 215e can be selected to trigger a dropdown list of other applications with scheduling function(s) to be shared and/or synchronized with the schedule. For example, the user can post the full or a portion of the schedule on a professional social media application (e.g., LINKEDIN®) to promote a science fair. In addition, the control pane 215 includes a search field 215f for a user to enter a search word, phrase, paragraph, and the like within the prompt history, the scheduled and/or prioritized task data 146, the schedule data 148, and the like. The fields in the AI-assisted schedule planning application can provide auto-fill and/or spell-check functions.

In some implementations, the "Ask me anything" prompt is automatically presented on the user interface 205 when the user requests to generate a new schedule, and/or accesses the AI-assisted schedule planning application. Alternatively, the "Ask me anything" prompt may be displayed in response to a user input, such as a keystroke combination or in response to the user activating a menu item or other user interface element on the user interface 205.

FIG. 2B shows an example of the user interface 205 in which an application selection pane is presented, either automatically or in repose to an activation of the AI-assisted schedule planning application. In this example, the user interface 205 includes an application selection pane 245, a control pane 255, a schedule pane 265, and the scrollbar 235. The user interface 205 may be implemented by the native application 114 and/or the browser application 112.

The application selection pane 245 lists Email Application A, Calendar Application B, Task Management application C, Software Development Application D, and the like for the user to select as use data source(s) for planning a schedule. The application selection pane 245 also includes an input box 245a enabling the user to enter a desired schedule time frame, such as a day, a week, a month, a year, or the like.

In some implementations, the control pane 255 includes a My Day tab/button 255a, a Try a Different Suggest tab/button 255b, an Add Free Slot tab/button 255c, and a Chat tab/button 255d. The My Day tab/button 255a can be selected to provide schedule planning assistant functions as later discussed. Other tabs can also be added for user selection to perform standard common tasks that users wish to perform.

In this example, in response to the user selection of Email Application A, Calendar Application B, Task Management application C, Software Development Application D, and the My Day tab/button 255a, the system generates a schedule in the schedule pane 265 based on the user data from Email Application A, Calendar Application B, Task Management application C, and Software Development Application D.

In response to the user selection of the Try a Different Suggest tab/button 255b, the system can generate alternative schedule(s) for the user. In response to the user selection of the Add Free Slot tab/button 255c, the system can add breaks into the schedule to avoid a packed day.

In response to the user selection of the Chat tab/button 255d, the system can switch the user interface to an AI-chat, such as FIG. 2A, and then the user can interact with the application through a chat box, where the user can give commands to the AI to modify the schedule. For example, the user provides voice commands and/or enters prompts "add time for breakfast", and/or "remove checking emails from the schedule." These commands can be used to augment the prompt and the new prompt can be sent to the generative model 126.

These commands could be saved and replayed, so the user does not have to repeat them each time the application is used. For example, the user prompts the application to always add time for breakfast, or to add time for breakfast only when they have a meeting at 9:00 am. The application could learn which commands to apply every day based on the wording, e.g., if the prompt contains "always". There could also be a field in the user interface 205 to input these everyday commands. In other embodiments, the system supports more complex commands, like "allocate 4 hours per day to items from Azure DevOps".

In addition, the control pane 255 includes a search field 255e for a user to enter a search word, phrase, paragraph, and the like within the schedule and/or the scheduled and/or prioritized task data 146, and the like. The fields in the AI-assisted schedule planning application can provide auto-fill and/or spell-check functions.

In some implementations, the system provides a feedback loop by augmenting thumbs up and thumbs down buttons for each scheduled item in the user interface 205. If the user dislikes a task item, the system can ask why and use the input to improve the schedule. A thumbs down click could also prompt the user to indicate whether the task item was scheduled for too long, too short, or was assigned the wrong importance.

As such, the user prompts and the user data are submitted to the application services platform 110 to generate the scheduled and/or prioritized task data 146 and the schedule data 148 using the generative model 126, and the user feedback data can be used to improve the generative model 126.

FIG. 3 is a diagram showing additional features of the prompt construction unit 124 of the application services platform shown in FIG. 1. The prompt construction unit formats and submits the prompt for the generative model 126. The prompt construction unit 124 includes a prompt formatting unit 302 and a prompt submission unit 304.

The prompt formatting unit 302 receives a natural language prompt input by the user and the user data source(s) selected by the user (e.g., FIG. 2B) and/or defaulted by the system. The prompt formatting unit 302 formats the system prompt and/or the user/employee data according to a prompt template and includes the user prompt and at least a portion of the user/employee data in the system prompt. A system prompt template (e.g., the system prompt in Table 1) can include instructions that guide the generative model 126 to generate a schedule. The system can instruct the generative model 126 to generate a single-shot prompt (i.e., including a single example or instruction to guide the language model's response) or a multi-shot prompt (i.e., including multiple examples or instructions to give the model more context and improve its understanding of the task) to query the user for generating a schedule.

Other implementations may include instructions in addition to and/or instead of one or more of these instructions. Furthermore, the specific format of the prompt may differ in other implementations.

In one embodiment, the prompt formatting unit 302 is configured to select a predetermined number of task items to be included in the system prompt to be sent to the generative model 126. If the number of task items is less than a predetermined number, then the prompt formatting unit 302 includes all of the task items. The number of task items may be determined at least in part based on the prompt size limits of the generative model 126. Language models typically have a limit on the number of tokens that can be included in the prompt, which will limit the number of task items and other items to be included in the prompt. For instance, the average system prompt size can be 6,425 characters for GPT 3.5 turbo, or far larger depending on the generative model. GPT 3.5 turbo is limited to 16,000 tokens, which is similar to 16,000 syllables. The included task items can be formatted into a format directly processible by the generative model 126, such as JSON. An example of the result schedule JSON payload is included in Table 2.

TABLE 2

```
[
  {
    "startTime": "10:00",
    "endTime": "10:01",
    "title": "Book Flu Vaccine",
    "source": "Microsoft Outlook Calendar",
    "advice": [
    "Book flu vaccine on Tuesday 12th September, 10am"
    ]
  },
  {
```

TABLE 2-continued

```
"startTime": "10:01",
"endTime": "11:00",
"title": "Check Email",
"source": "Microsoft Outlook Mail", "advice": [
"Read 10 emails in Focused Inbox"
]
},
{
"startTime": "11:00",
"endTime": "12:00",
"title": "Task 7454269: Validate attribute based ICM for frontend",
"source": " Azure DevOps",
```

In some implementations, the application services platform 110 includes a moderation services that analyze user prompt(s), content generated by the generative model 126, and/or the user data 132a obtained from the user database 132, to ensure that potentially objectionable or offensive content is not generated or utilized by the application services platform 110.

If potentially objectionable or offensive content is detected in the user data 132a obtained from the user database 132, the moderation services provides a blocked content notification to the client device 105 indicating that the prompt(s), the user data 132a is blocked from forming the system prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model 126 as an input.

In one embodiment, the prompt submission unit 304 submits the user prompt(s), and/or the system prompt to the moderation services to ensure that the prompt does not include any potentially objectionable or offensive content. The prompt formatting unit 302 halts the processing of the user prompt(s), and/or the system prompt in response to the moderation services determining that the user prompt(s) and/or the schedule data includes potentially objectionable or offensive content. As discussed in the preceding examples, the moderation services generates a blocked content notification in response to determining that the user prompt(s), and/or the system prompt includes potentially objectionable or offensive content, and the notification is provided to the native application 114 or the browser application 112 so that the notification can be presented to the user on the client device 105. For instance, the user may attempt to revise and resubmit the user prompt(s). As another example, the system may generate another system prompt after removing task data associated with the potentially objectionable or offensive content.

The prompt submission unit 304 submits the formatted/system prompt to the generative model 126. The generative model 126 analyzes the prompt and generates a schedule based on the formatted/system prompt. The prompt submission unit 304 submits the schedule generated by the generative model 126 to the moderation services to ensure that the schedule does not include any potentially objectionable or offensive content. The prompt formatting unit 302 can halt the processing of the schedule in response to the moderation services determining that the schedule includes potentially objectionable or offensive content. The moderation services generates a blocked content notification in response to determining that the schedule includes potentially objectionable or offensive content, and the notification is provided to the prompt formatting unit 302. The prompt formatting unit 302 may attempt to revise and resubmit the schedule. If the moderation services does not identify any issues with the schedule output by the generative model 126 in response to the system prompt, the prompt submission unit 304 provides the schedule to the request processing unit 122. The request processing unit 122 provides the schedule to the native application 114 or the browser application 112 depending upon which application was the source of the schedule request.

The moderation services performs several types of checks on the task schedule(s) being accessed or modified by the user in the native application 114 or the browser application 112, the natural language prompt input by the user, the user data 132a obtained from the user database 132, and/or the schedule generated by the generative model 126. The moderation services can be implemented by a machine learning model trained to analyze the content of these various inputs and/or outputs to perform a semantic analysis on the content to predict whether the content includes potentially objectionable or offensive content. The moderation services can perform another check on the content using a machine learning model configured to analyze the words and/or phrase used in content to identify potentially offensive language/image/sound. The moderation services can compare the language used in the content with a list of prohibited terms/images/sounds including known offensive words and/or phrases, images, sounds, and the like. The moderation services can provide a dynamic list that can be quickly updated by administrators to add additional prohibited terms/images/sounds. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services may vary from implementation to implementation. If one or more of these checks determines that the textual content includes offensive content, the moderation services can notify the application services platform 110 that some action should be taken.

In some implementations, the moderation services generates a blocked content notification, which is provided to the client device 105. The native application 114 or the browser application 112 receives the notification and presents a message on a user interface of the application that the user prompt received by the request processing unit 122 could not be processed. The user interface provides information indicating why the blocked content notification was issued in some implementations. The user may attempt to refine a natural language prompt to remove the potentially offensive content. A technical benefit of this approach is that the moderation services provides safeguards against both user-created and model-created content to ensure that prohibited offensive or potentially offensive content is not presented to the user in the native application 114 or the browser application 112.

FIG. 4 is a diagram showing additional features of the data pre-processing unit 128 of the application services platform shown in FIG. 1. The data pre-processing unit 128 includes a data retrieval unit 402, and a format converting unit 404. The data pre-processing unit 128 can access user data source(s) (e.g., the user-selected email, calendar, task management, software development applications in FIG. 2B) for which user data 132a is to be obtained from for pre-processing, such as extracting task data, thereby reducing the data included in the system prompt to satisfy prompt size limit(s).

As mentioned, the user database 132 may include structured task data (e.g., calendar entries from calendar application(s), task entries from task management application(s), and the like), semi-structured task data (e.g., emails from email application(s), tweets, and the like), un-structured user data (e.g., a blog post, a social media post, and the like), and/or user preference data.

The data retrieval unit 402 can directly extract task elements from structured data, such as calendar application entries containing elements such as title (e.g., "Meeting with Alice", "Doctor's appointment"), start date/time, end date/time, location, description, attendee(s), recurrence rule(s), and the like.

On the other hand, emails from email application(s) including email messages and/or other types of messages including unstructured data may be handled differently by the data retrieval unit 402 to extract task elements such as a user role, a deadline, an importance level, and the like. An email has some structured elements (including sender, recipient, date, subject, and metadata (e.g., priority)), and unstructured elements (e.g., a body of the email, attachments (e.g., images, documents, videos)). The text in the email body can be in any format, and it does not have to follow any predefined rules. The data retrieval unit 402 can easily search and analyze the structured elements of an email to retrieve task elements. The data retrieval unit 402 can use a machine learning model to extract task elements from the unstructured body of the email, such as a type of a task, the user's sentiment for the task, or the priority of the task.

As another example, task management application entries are semi-structured data. They have some structured elements, such as the task name, due date, priority, notes, and status (e.g., "To Do", "In Progress", "Completed"), and unstructured elements (e.g., the task description in any format). As yet another example, software development application entries are also semi-structured data. They have some structured elements (e.g., task name, task type, agent job, parameters, and status (e.g., "Queued", "In Progress", "Completed")), and unstructured elements (e.g., task description and instructions in any format). By analogy, the data retrieval unit 402 can use a machine learning model to extract task elements from the unstructured task descriptions and instructions.

The user database 132 can be implemented on the application services platform 110 in some implementations. In other implementations, at least a portion of the user database 132 are implemented on an external server that is accessible by the data retrieval unit 402 of the data pre-processing unit 128.

As mentioned, the application services platform 110 complies with privacy guidelines and regulations that apply to the usage of the user data 132a included in the user database 132 to ensure that users have control over how the application services platform 110 utilizes their data. The user is provided with an opportunity to opt into the application services platform 110 to allow the application services platform 110 to access the user data 132a and enable the generative model 126 to generate content according to user preferred style(s)/format(s). In some implementations, the first time that an application, such as the native application 114 or the browser application 112 presents the data analysis assistant to the user, the user is presented with a message that indicates that the user may opt into allowing the application services platform 110 to access user data included in the user database 132 to support the data analysis assistant functionality. The user may opt into allowing the application services platform 110 to access all or a subset of user data included in the user database 132. Furthermore, the user may modify their opt-in status at any time by accessing their user data and selectively opting into or opting out of allowing the application services platform 110 from accessing and utilizing user data from the user database 132 as a whole or individually.

The data retrieval unit 402 is configured to formulate a query to the user database 132 based on the user ID, and to provide any task items retrieved to the format converting unit 404. As mentioned, the user data 132a and/or the task data can be converted to a format directly processable by the generative model 126.

For instance, the data retrieval unit 402 is configured to utilize user data associated with various applications and/or cloud-based services that has been authored by and/or associated with the user, such as but not limited to MICROSOFT WORD®, MICROSOFT TEAMS®, MICROSOFT ONEDRIVE®, MICROSOFT OUTLOOK®, and/or other applications and/or cloud-based services. For instance, the employee and organization data 140 may include enterprise-specific information associated with the user/employee, projects associated with the enterprise, project teams within the enterprise, and/or the technologies implemented by the enterprise, such as enterprise-specific terminology, acronyms, project names, and/or other terminology that may be utilized in the content items authored by the user. A technical benefit of this approach is that the generative model 126 is able to mimic the enterprise-specific terminology utilized by the user in the schedule generated by the generative model 126 in addition to a schedule presentation style(s)/format(s) preferred by the user.

The data retrieval unit 402 is configured to select a predetermined number of content items to be included in the system prompt to be sent to the generative model 126. If the number of characters and/or the number of content items is less that this predetermined number, then the data retrieval unit 402 includes all of the characters and/or the content items. The number of characters and/or the number of content items selected may be determined at least in part on the prompt size limits of the generative model 126. As mentioned, language models typically have a limit on the number of tokens that can be included in the prompt, which will limit the number of characters and/or the number of content samples, including the previously discussed task items, and other items that can be included in the system prompt. The selected task items can be input to the format converting unit 404 to be formatted into a format directly processable by the generative model 126.

Referring back to FIG. 3, the prompt formatting unit 302 can incorporate the formatted task items output by the format converting unit 404 into the system prompt to be sent by the prompt submission unit 304 to the generative model 126. The generative model 126 can process the task items to provide a schedule. The generative model 126 can also analyze the tasks in the schedule to determine and suggest actions to be taken to complete a task. The generative model 126 can then provide the schedule and the actions in a preferred presentation style/format for the user.

Figure 7:
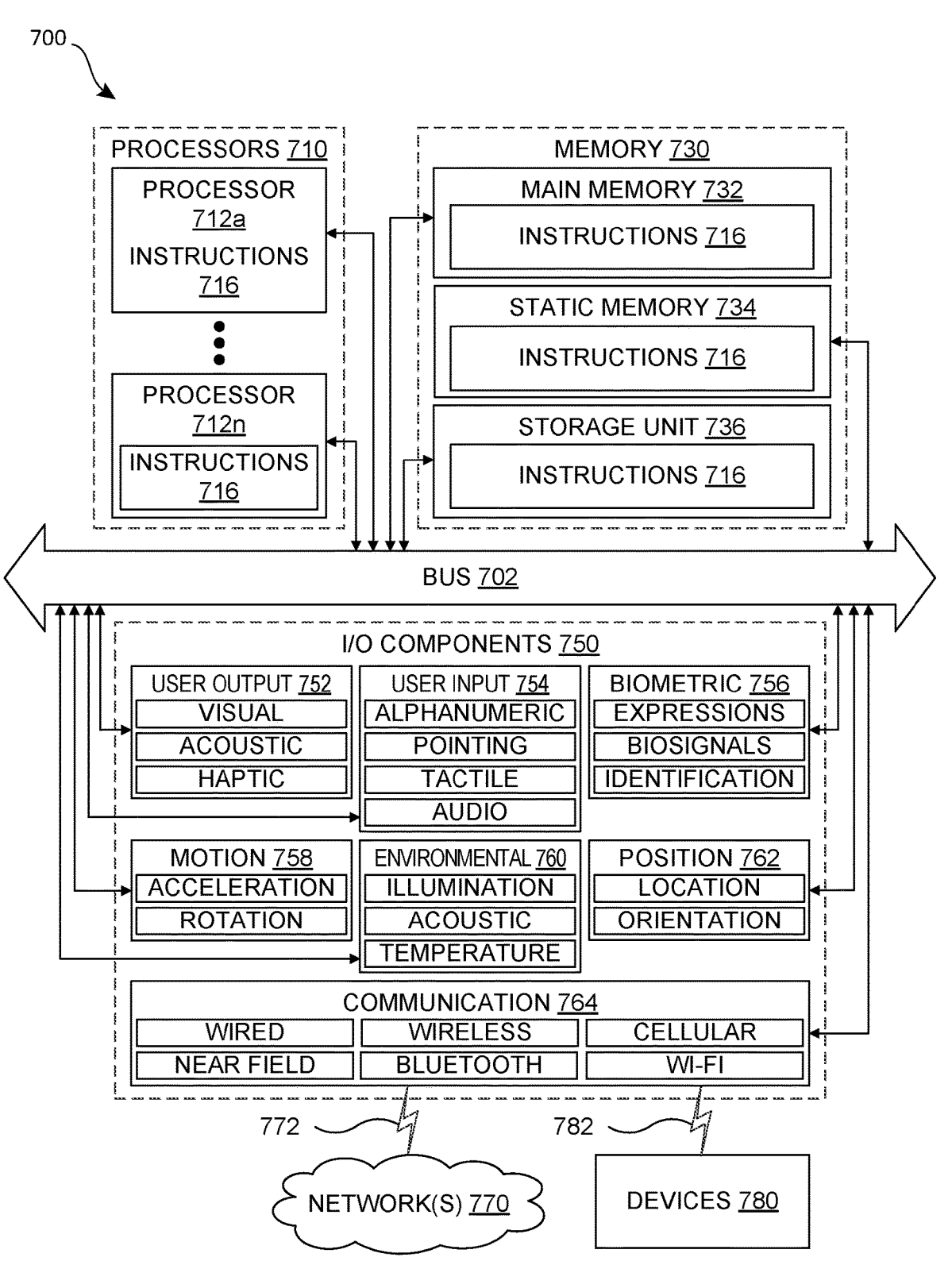
FIG. 7 is a block diagram showing components of an example machine configured to read instructions from a machine-readable medium and perform any of the features described herein.

FIG. 5 is a flow chart of an example process 500 for providing AI-assisted schedule planning according to the techniques disclosed herein. The process 500 can be implemented by the application services platform 110 or its components shown in the preceding examples. The process 500 may be implemented in, for instance, the example machine including a processor and a memory as shown in FIG. 7. As such, the application services platform 110 can provide means for accomplishing various parts of the process 500, as well as means for accomplishing embodiments of other processes described herein in conjunction with other components of the example computing environment 100. Although the process 500 is illustrated and described as a sequence of steps, it is contemplated that various embodiments of the process 500 may be performed in any order or combination and need not include all the illustrated steps.

In one embodiment, for example, in step 502, the request processing module 122 receives, via a first software application on a client device (e.g., the client device 105) of a user (e.g., an IT professional, a salesperson, or the like), a call requesting a schedule to be generated for the user by a generative model (e.g., the generative model 126). For example, the call can be triggered upon activation of the first software application or by a second prompt (e.g., a user prompt: "help me set up a daily schedule") input via the user interface (e.g., the user interface 205) of the client device (e.g., the client device 105).

In step 504, the request processing module 122 identifies one or more online data sources (e.g., Email Application A, Calendar Application B, Task Management application C, Software Development Application D, and the like), one or more offline data sources (e.g., books, posters, and the like), or a combination thereof indicating one or more activities (e.g., AI training sessions, lunch break, software development meeting, and the like) specific to the user. In one embodiment, the data sources are predetermined. In another embodiment, the data sources are pluggable, e.g., via a set of APIs, to dynamically pull data from any data sources as desired.

For instance, the one or more online and offline data sources include one or more second software applications within a workspace (e.g., MICROSOFT TO DO®, MICROSOFT OUTLOOK CALENDAR®, MICROSOFT OUTLOOK MAIL®, AZURE DEVOPS®, and the like. The first software application is a stand-alone software application, or a component of one of the second software applications or another application. For example, the one or more second software applications include a plurality of software applications comprising a word processing application, a presentation application, a note taking application, a text editing application, an email application, a spreadsheet application, a desktop publishing application, a digital drawing application, a communications application, a task management application, or a combination thereof, and the schedule includes entries of activities across the plurality of software applications.

In step 506, a prompt construction unit (e.g., the prompt construction unit 124) constructs a first prompt (e.g., the prompt in Table 1) as an input to the generative model. In one embodiment, the prompt construction unit constructs the first prompt (e.g., the prompt in Table 1) by appending the one or more activities and context data to an instruction string. For instance, the instruction string comprises instructions to the generative model to schedule the one or more activities based on the context data, and to assign the scheduled one or more activities into the schedule. The context data can be associated with the user (e.g., user lunch preferences), the one or more activities (e.g., AI training sessions), or a combination thereof.

In step 508, the request processing module 122 provides the schedule to the client device (e.g., the client device 105). In step 510, the request processing module 122 causes a user interface (e.g., the user interface 205) of the client device to present the schedule (e.g., FIG. 2A). For example, the request processing module 122 causes a presentation of the schedule in a calendar-based view depicting one or more calendar entries of the assigned one or more activities in the user interface (e.g., FIG. 2B), and the context data comprises one or more preferences associated with the user, one or more of the first and second software applications, one or more locations, one or more scheduling times, or a combination thereof associated with the one or more activities, or a combination thereof.

In another embodiment, the instruction string in the system prompt further comprises instructions to the generative model to (1) extract or infer from the one or more activities and/or the context data, a user role, a deadline, an importance level, or a combination thereof per activity, and (2) schedule and/or prioritize the one or more activities based on the user role, the deadline, the importance level, or a combination thereof. For instance, for tasks without marking of an importance level, the system can infer the importance level from the title and description. For example, "investigate bank account fraud" is deemed higher priority than "check email."

In some implementations, the system provides a means for the user to assign different relative priorities to different data sources. For example, tasks from Microsoft Planner® could always be deemed of higher priority than the tasks from MICROSOFT TO DOR. This can be done based on work role. For example, a software engineer has the AZURE DEVOPS® tasks scheduled and/or prioritized over other task data sources, whereas a salesperson has the Microsoft Dynamics® tasks scheduled and/or prioritized over other task data sources.

Resolving task item conflicts involves identifying overlapping tasks and finding a way to accommodate them without double-booking, such as moving a less important task to a different time slot. For a team work plan, the system can establish clear guidelines/rules for scheduling tasks to avoid conflicts.

In another embodiment, the instruction string in a system prompt comprises instructions to the generative model (e.g., the generative model 126) to infer one or more suggestions to complete a respective activity (e.g., AZURE DEVOPS® Task 7454269: Validate attribute based Incident Management System for frontend) in the schedule (e.g., in FIG. 2B), the one or more suggestions comprising one or more actions (e.g., to validate the attribute based Incident Management System for the frontend, and to collaborate with Anna on this task), one or more time slots (e.g., 13:00-14:00), or a combination thereof, and the user interface is caused to present the schedule with the one or more suggestions. For instance, the system can allocate some time for reading emails, based on the number and importance of the user's unread emails.

In another embodiment, the prompt construction unit constructs a second prompt further based on the one or more prompt engineering parameters. For example, the one or more prompt engineering parameters comprise temperature, top-p, presence penalty, or a combination thereof. Temperature is a parameter controlling the randomness of the generated output. A higher temperature value leads to more randomness and diversity in the generated text, while a lower temperature value produces more focused and deterministic responses. By controlling the "temperature" parameter of the generative AI, which influences the level of variability and creativity, the system and/or the user can ask the AI to generate an alternative schedule.

Top-p is a sampling technique to control the diversity of the output of a large language model (LLM), p is a value between 0 and 1. A higher value of p will lead to more diversity in the output, while a lower value of p will lead to more focused responses. Presence penalty is used to discourage large language models (LLMs) from generating repetitive or uninformative text, by penalizing the probability of generating a token that is already present in the prompt or the generated text so far.

In some implementations, the one or more prompt engineering parameters are pre-determined for the generative model (e.g., the generative model 126) or received via the user interface (e.g., the user interface 205) in conjunction with the user request (e.g., via selecting the Try a Different Suggestion tab/button 255*b* in FIG. 2B). The request processing module 122 then provides the alternative schedule to the client device (e.g., the client device 105), and causes the user interface (e.g., the user interface 205) to present the alternative schedule.

In another embodiment, in response to one or more notifications, sensor data (e.g., the sensor data 116), or a combination thereof received from the client device (e.g., the client device 105), the request processing module 122 determines that at least one of the activities in the schedule has been updated within one of the first and second software applications or the schedule, and synchronizes, based on the determining, the at least one updated activity in the other one of the one software application and the schedule. For example, the at least one updated activity includes adding a new activity (e.g., check personal emails), deleting one of the one or more activities (e.g., skip lunch break), one or more location changes (e.g., the Science Fair moves location to another building), one or more scheduling time changes (e.g., the Science Fair moves location to another day), one or more context changes (e.g., the IT professional gets a new software certificate), or a combination thereof. In yet another embodiment, synchronizing further comprises synchronizing the other one of the one software application and the schedule in real-time or nearly real-time with the determining.

For example, the system can synchronize changes to the schedule to Outlook calendar or any other calendar system (e.g., adding newly scheduled task items to the user's calendar). The system can also create notifications of the newly scheduled task items.

In some implementations, the system can open the task immediately before the task is to be performed, so that the user can read the full details of the task. In other implementations, the system can open the relevant applications related to the tasks automatically to prepare for the task. For example, when the user has a task from Azure DevOps, this would often involve working in Visual Studio and the system can open this application automatically for the user to perform the task. As another example, the system can parse the description of the task to infer a relevant application to open.

In some implementations, the system can close the tasks automatically when the tasks are done or ask for user confirmation before closing the tasks. For tasks with the remaining work to be done, the system can update the task with the new remaining work to be completed later. For example, the system can check with the user at the end of each day or at the beginning of each subsequent day, and ask if the tasks were all completed. If not, the system can update the schedule for the remaining days after asking what was achieved/not achieved, and the system can then schedule and/or prioritize the now most important tasks. This avoids the scenario where the user does not complete the most important tasks, yet the user is assigned with tasks of lesser importance for the remainder of the week.

In other implementations, the system can perform the actions of a task on behalf of the user. For example, if the user has a task such as "send email draft at 16:00", this could be automatically performed by the system.

In another embodiment, the prompt construction unit constructs a third prompt as an input to the generative model (e.g., the generative model 126), by appending the at least one updated activity and additional context data associated with the at least one updated activity to another instruction string. The other instruction string comprises instructions to the generative model to re-schedule and/or re-prioritize the one or more activities based on the additional context data, and to assign the re-scheduled and/or re-prioritized one or more activities into another schedule. The request processing module 122 then provides the other schedule to the client device (e.g., the client device 105), and causes the user interface (e.g., the user interface 205) to present the other schedule.

In one embodiment, the context data includes whether a respective activity can be rescheduled or not, and the instruction string comprises instructions to the generative model (e.g., the generative model 126) to: assign the respective activity with a respective fixed time slot thereof (e.g., assigned each calendar application entry with a fixed time slot), when determining the respective activity cannot be rescheduled, and assign the respective activity (e.g., check personal emails) based on a flexible time frame or no time frame, when determining the respective activity can be rescheduled. In some implementations, the generative model 126 is allowed to move around activities, then suggests sending notifications to the attendees, and/or suggests preferable meeting times to a meeting organizer.

In another embodiment, the instruction string comprises instructions to the generative model (e.g., the generative model 126) to: (1) extract or infer, from the one or more activities, the context data, or a combination thereof, additional characteristics of the one or more activities, the additional characteristics including a task assigned to or by the user, an entity assigned the task, a time point when the task was assigned, criticality of the task, a work amount of the task, a number of tasks dependent on the task, importance of a project including the task to the entity, a number of times mentioning the task, whether the task can be broken down into subtasks and allotted to different time slots, or a combination thereof; and (2) schedule and/or prioritize the one or more activities further based on the additional characteristics.

For example, the system considers the amount of work involved in a task when a task item including information on the amount of work involved, as is often the case for software engineering tasks. If the task item is too large to fit within a contiguous block given the presence of meetings, it can be divided into multiple discrete blocks. The task could also be split across multiple days if appropriate.

In one embodiment, the request processing module 122 determines a preferred output format for the user based on user data associated with the user. In another embodiment, the example computing environment 100 can encrypt communication between the data processing system, the client device, and an enterprise system of the enterprise using a cryptographic protocol, and isolates enterprise data by keeping containers, storages, or a combination thereof at least logically or physically separate from other enterprises.

Therefore, the system can assist users to apply user data from different sources (e.g., email applications, calendar application, task management application, software development applications, and the like) in a system prompt to generate a schedule, via a chat interface. Such interactive, chat-based schedule planning assistance can help a user to generate a schedule comprehensively, quickly and accurately. In particular, the system supports generating effective system prompts with extracted task data from online/offline sources, and such system prompts are clear, concise, and provide enough context for the language model to generate the schedule. In addition, the system provides users interactive tools to refine the schedule, and infer actions to complete tasks in the schedule.

For example, the system uses generative AI to create a daily schedule for an individual. Each task is assigned a discrete timeslot and includes a set of inferred actions that provide context and relevant documentation to help the user perform the task. The user can use the AI-assisted schedule planning application at the start of a day and view a schedule of tasks and suggested actions to complete each task. In this way, the user no longer needs to look through the disparate task sources and work out how to divide the time among the tasks.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
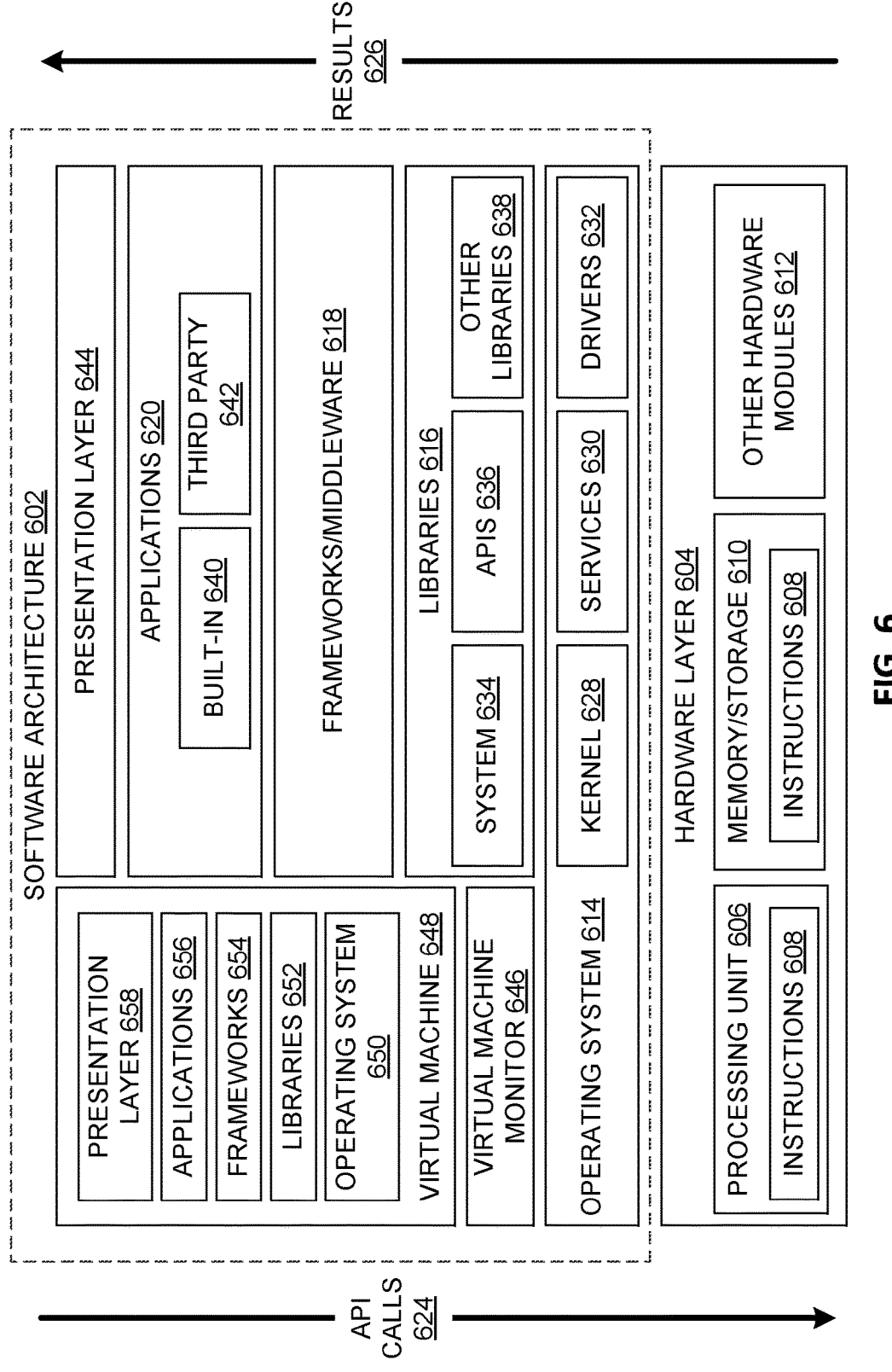
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory

730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a machine-readable storage medium storing executable instructions that, when executed, cause the processor alone or in combination with other processors to perform operations of:

receiving, via a chat interface or a plug-in of a first software application on a client device of a user, a call requesting a schedule to be generated for the user by a generative language model;

identifying one or more online data sources, one or more offline data sources, or a combination thereof indicating a plurality of activities specific to the user, the one or more online data sources, the one or more offline data sources, or the combination thereof including one or more second software applications within a workspace, wherein the first software application is a stand-alone software application, or a component of one of the one or more second software applications or another application;

constructing a first prompt by a prompt construction unit as an input to the generative language model, the prompt construction unit constructing the first prompt by appending the activities and context data to an instruction string, the instruction string comprising natural language instructions to the generative language model to:

concurrently assign the activities into a plurality time slots in the schedule based on the context data, and parse a description of the activities to infer an identification of an application to open on a user interface of the client device before a respective time slot set for a respective activity among the activities in the schedule, the context data including the description of the activities;

providing as an input the first prompt to the generative language model and receiving as an output the schedule and the identification of the application from the generative language model;

providing the output to the client device;

causing the user interface of the client device to present the schedule; and automatically opening the application on the user interface of the client device before the respective time slot for the user to complete the respective activity, wherein the processor is embedded in the client device or a server connecting to the client device via a network.

2. The data processing system of claim 1, wherein the instruction string comprises natural language instructions to the generative language model to:

infer from at least one of the activities or the context data at least one of a user role, a deadline, or an importance level per activity; and prioritize the activities based on at least one of the user role, the deadline, the importance level.

3. The data processing system of claim 1, wherein the generative language model is a large language model, wherein the instruction string comprises natural language instructions to the large language model to infer one or more suggested actions for the user to take to complete a respective activity in the schedule, the one or more suggested actions include context and relevant documentation to assist the user to complete the respective activity, and wherein causing the user interface to present the schedule comprises causing the user interface to present the schedule with the one or more suggested actions.

4. The data processing system of claim 1, wherein the machine-readable storage medium further includes instructions configured to cause the processor alone or in combination with other processors to perform operations of:

receiving, via the user interface, a user request for an alternative schedule to be generated for the user;

constructing a second prompt by the prompt construction unit further based on one or more prompt engineering parameters, wherein the one or more prompt engineering parameters comprise temperature, top-p, presence penalty, or a combination thereof, and the one or more prompt engineering parameters are pre-determined for the generative language model or received via the user interface in conjunction with the user request;

providing the alternative schedule to the client device; and causing the user interface to present the alternative schedule.

5. The data processing system of claim 1, wherein the machine-readable storage medium further includes instructions configured to cause the processor alone or in combination with other processors to perform operations of:

in response to at least one of one or more notifications, or sensor data received from the client device, determining that at least one of the activities in the schedule has been updated within one of the first application and the one or more second software applications or the schedule; and synchronizing, based on the determining, the at least one updated activity in the other one of the first software application and the one or more second software applications or the schedule.

6. The data processing system of claim 5, wherein the synchronizing further comprises:

synchronizing the other one of the first software application and the one or more second software applications or the schedule in real-time or nearly real-time with the determining.

7. The data processing system of claim 5, wherein the machine-readable storage medium further includes instructions configured to cause the processor alone or in combination with other processors to perform operations of:

constructing a third prompt by the prompt construction unit as an input to the generative language model, the prompt construction unit constructing the third prompt by appending the at least one updated activity and additional context data associated with the at least one updated activity to another instruction string, the another instruction string comprising natural language instructions to the generative language model to re-schedule the activities based on the additional context data, and to assign the re-scheduled activities into another schedule;

providing the another schedule to the client device; and causing the user interface to present the another schedule.

8. The data processing system of claim 5, wherein the at least one updated activity includes at least one of adding a new activity, deleting one of the activities, one or more location changes, one or more scheduling time changes, or one or more context changes.

9. The data processing system of claim 1, wherein the context data includes whether a respective activity can be rescheduled or not, and the instruction string comprises natural language instructions to the generative language model to:

assign the respective activity with a respective fixed time slot thereof, when determining the respective activity cannot be rescheduled, and assign the respective activity based on a flexible time frame or no time frame, when determining the respective activity can be rescheduled.

10. The data processing system of claim 1, wherein the machine-readable storage medium further includes instructions configured to cause the processor alone or in combination with other processors to perform operations of:

causing a presentation of the schedule in a calendar-based view depicting one or more calendar entries of the activities in the user interface, and wherein the context data comprises one or more preferences associated with the user, at least one of one or more of the first application and the one or more second software applications, one or more locations, or one or more scheduling times associated with the activities, or a combination thereof.

11. The data processing system of claim 1, wherein the instruction string comprises natural language instructions to the generative language model to:

extract or infer, from at least one of the activities, or the context data, additional characteristics of the activities, the additional characteristics including at least one of a task assigned to or by the user, an entity assigned the task, a time point when the task was assigned, criticality of the task, a work amount of the task, a number of tasks dependent on the task, importance of a project including the task to the entity, a number of times mentioning the task, or whether the task can be broken down into subtasks and allotted to different time slots; and prioritize the activities further based on the additional characteristics.

12. The data processing system of claim 1, wherein the call is triggered upon activation of the first software application or by a fourth prompt input via the user interface of the client device, wherein the one or more second software applications include a plurality of software applications comprising at least one of a word processing application, a presentation application, a note taking application, a text editing application, an email application, a spreadsheet application, a desktop publishing application, a digital drawing application, a task management application, or a communications application, and wherein the schedule includes entries of activities across the plurality of software applications.

13. A method comprising:

receiving, by a processor via a chat interface or a plug-in of a first software application on a client device of a user, a call requesting a schedule to be generated for the user by a generative language model;

identifying one or more online data sources, one or more offline data sources, or a combination thereof indicating a plurality of activities specific to the user, the one or more online data sources, the one or more offline data sources, or the combination thereof including one or more second software applications within a workspace, wherein the first software application is a stand-alone software application, or a component of one of the one or more second software applications or another application;

constructing a first prompt by a prompt construction unit as an input to the generative language model, the prompt construction unit constructing the first prompt by appending activities and context data to an instruction string, the instruction string comprising comprising natural language instructions to the generative language model to:

concurrently assign the activities into a plurality time slots in the schedule based on the context data, and parse a description of the activities to infer an identification of an application to open on a user interface of the client device before a respective time slot set for a respective activity among the activities in the schedule, the context data including the description of the activities;

providing as an input the first prompt to the generative language model and receiving as an output the schedule and the identification of the application from the generative language model;

providing the output to the client device;

causing the user interface of the client device to present the schedule; and automatically opening the application on the user interface of the client device before the respective time slot for the user to complete the respective activity, wherein the processor is embedded in the client device or a server connecting to the client device via a network.

14. The method of claim 13, wherein the instruction string comprises natural language instructions to the generative language model to:

infer from at least one of the activities or the context data at least one of a user role, a deadline, or an importance level per activity; and prioritize the activities based on at least one of the user role, the deadline, the importance level.

15. The method of claim 13, wherein the generative language model is a large language model, wherein the instruction string comprises natural language instructions to the large language model to infer one or more suggested actions for the user to take to complete a respective activity in the schedule, the one or more suggested actions include context and relevant documentation to assist the user to complete the respective activity, and wherein causing the user interface to present the schedule comprises causing the user interface to present the schedule with the one or more suggested actions.

16. A non-transitory computer readable medium on which are stored instructions that, when executed, cause a programmable device to perform functions of:

receiving, via a chat interface or a plug-in of a first software application on a client device of a user, a call requesting a schedule to be generated for the user by a generative language model;

identifying one or more online data sources, one or more offline data sources, or a combination thereof indicating a plurality of activities specific to the user, the one or more online data sources, the one or more offline data sources, or the combination thereof including one or more second software applications within a workspace, wherein the first software application is a stand-alone software application, or a component of one of the one or more second software applications or another application;

constructing a first prompt by a prompt construction unit as an input to the generative language model, the prompt construction unit constructing the first prompt by appending the activities and context data to an instruction string, the instruction string comprising natural language instructions to the generative language model to:

concurrently assign the activities into a plurality time slots in the schedule based on the context data, and parse a description of the activities to infer an identification of an application to open on a user interface of the client device before a respective time slot set for a respective activity among the activities in the schedule, the context data including the description of the activities;

providing as an input the first prompt to the generative language model and receiving as an output the schedule and the identification of the application from the generative language model;

providing the output to the client device;

causing the user interface of the client device to present the schedule; and automatically opening the application on the user interface of the client device before the respective time slot for the user to complete the respective activity, wherein the programmable device is embedded in the client device or a server connecting to the client device via a network.

17. The non-transitory computer readable medium of claim 16, wherein the instruction string comprises natural language instructions to the generative language model to:

infer from at least one of the activities or the context data at least one of a user role, a deadline, or an importance level per activity; and prioritize the activities based on at least one of the user role, the deadline, the importance level.

18. The non-transitory computer readable medium of claim 16, wherein the generative language model is a large language model, wherein the instruction string comprises natural language instructions to the large language model to infer one or more suggested actions for the user to take to complete a respective activity in the schedule, the one or more suggested actions include context and relevant documentation to assist the user to complete the respective activity, and wherein causing the user interface to present the schedule comprises causing the user interface to present the schedule with the one or more suggested actions.

19. The data processing system of claim 1, wherein the context data includes that the respective activity can be divided into sub-activities and allotted to different time slots, and the instruction string comprises instructions to the generative language model to:

divide the respective activity into sub-activities; and schedule the sub-activities to different time slots in the schedule, wherein causing the user interface to present the schedule comprises causing the user interface to present the schedule with the sub-activities in the different time slots.

20. The data processing system of claim 1, wherein the context data includes a priority order of the one or more online data sources, the one or more offline data sources, or a combination thereof, and the instruction string comprises instructions to the generative language model to:

assign activities of a high priority data source with fixed time slots, when determining the respective activity cannot be rescheduled;

schedule the activities of the high priority data source to the fixed time slots;

assign activities of a low priority data source based on a flexible time frame or no time frame; and schedule the activities of the low priority data source to open time slots in the schedule.

* * * * *